Patented Apr. 10, 1928.

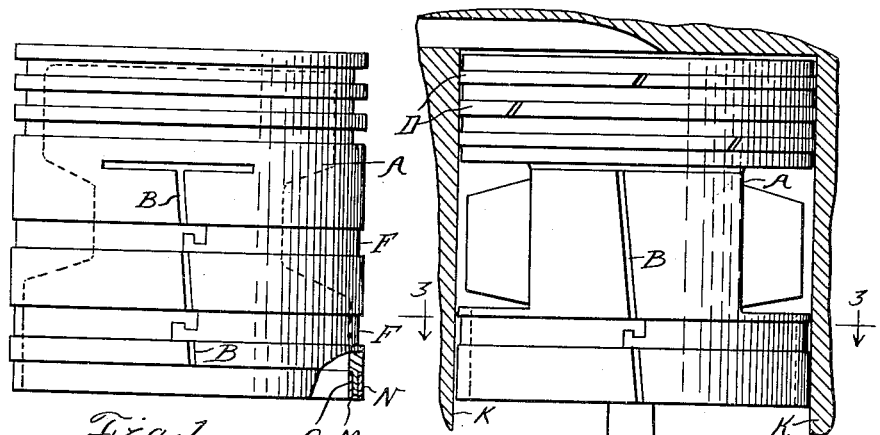

1,665,830

UNITED STATES PATENT OFFICE.

WILLIAM R. WILEY, OF MOUNT CLEMENS, MICHIGAN.

BUILT-UP PISTON.

Application filed February 7, 1925. Serial No. 7,474.

This invention relates to engine pistons, and has for its object an improved built-up piston member adapted for either steam or gas engine practice, wherein the relative lightness of aluminum is made use of, while its well-known high co-efficient of expansion when subjected to heat is counteracted by the association with it of an encircling or limit ring formed of a metal of relatively lower co-efficient of expansion, by means of which the normal tendency of the body of the piston to expand within its cylinder to a point where its periphery binds against the inner face of the enclosing cylinder is counteracted.

In the drawings:

Figure 1 is a side elevational view of a piston provided with the usual piston rings, and having its skirt slotted at one or more points to provide for its expansion, and with each of my improved types of ring in position thereabout.

Figure 2 is a similar view of a somewhat variant form of piston with one of my improved limit rings in position thereabout, and with the normal tendency of the piston body to expand indicated in exaggerated degree in dotted lines.

Figure 3 is a cross section taken along the line 3—3 of Figure 2, and looking in the direction of the arrows there shown.

Figures 4, 5, and 6 are elevational views of the meeting and interlocking ends of limit rings, bringing out the possible diversity of their formation.

Figure 7 is a fragmentary elevational view partly in section of a portion of the end of the piston with only one of my improved limit rings in position, it being so formed as to limit either inward or outward movement of the metal of which the piston is made.

The well known lightness of aluminum as contrasted with steel, brass, or the like would make it very attractive as a metal from which to form the pistons of gas engine cylinders and similar parts where the saving of weight is desirable, were it not for the fact that it expands so relatively rapidly when heated, that even the allowance of the usual clearance space in determining the diameter of the piston and the internal diameter of the cylinder in which it is to operate would not save the device from soon binding, when the piston is heated to any degree by normal operation. This is not remedied by the present well-known practice of providing approximately longitudinal slots or grooves into the body or skirt of the piston, since the expansion of the intermediate portions takes place and causes the binding against the cylinder walls in spite thereof. The use of a piston body of so much smaller diameter than the enclosing cylinder as to anticipate the expansive effect of heat on it, that is, so that when fully heated and expanded it is then of just proper diametrical extent relatively to the internal diameter of the cylinder, would result in the fit of the cold piston within its cylinder would be so loose as to be operatively impractical.

Attempts have heretofore been made to obviate these difficulties by positioning about the aluminum body of the piston limiting rings of steel, cast iron, bronze, or some similar metal whose coefficient of expansion when heated is relatively lower than that of aluminum. But all of these suggestions of which I am aware have involved either casting an aluminum piston body inside of a previously fabricated ring of iron or bronze, or else placing a broken ring thereabout and then brazing or spot-welding its meeting ends. Either of these processes, however, involves the presence adjacent the aluminum mass of such a degree of heat that the relatively more responsive metal of the piston absorbs such a proportion thereof that during the process of positioning the ring it expands to such a degree that its dimension about which the newly placed ring fits tightly is quite variant from its shrunken dimension when cooling has taken place, consequently the ferrous or bronze ring then no longer fits tightly enough to function as a limit ring, but fits so loosely as to rattle most objectionably.

My method of building up a piston while still taking advantage of the well-known lightness of aluminum, involves the provision of a piston body A, with the usual longitudinal or slightly inclined slots B in the skirt, and if desired, at one end such grooves as may be desired for still employing ferrous or bronze piston rings D. I also form, as at F, a relatively shallow annular groove, which, of course, reduces the diameter of the piston, and in it I place a limit ring or band E, of some such metal as steel, bronze, or the like, which has a relatively low co-efficient of expansion under the influence of heat, as compared with aluminum. The ring E must necessarily be broken at some point for positioning about the piston body, and to provide against any yielding of the ring as a whole from its intended peripheral measurement, I provide such interlocking means as are shown at G in Figure 4, H in Figure 5, and J in Figure 6. In any of these forms the fact that the mass or body of the ring is hedged in on either edge by the quite sharp sides of the groove F makes the escape of either interlocking part from engagement with the other impossible, since before the piston, as thus constituted, is submitted to the expansive influence of heat on its aluminum body, both the body and the encircling ring are inserted, and indeed operating inside of, the closely confining walls of the cylinder K. The various types of interlocking joints shown in Figures 4, 5 and 6 are merely intended to be illustrative, and I do not desire my disclosure to be restricted to them. But as to all of these forms, the firm limiting engagement of the ferrous or bronze ring about the aluminum body is effected by a purely mechanical interlocking of its meeting ends, without the use of any heat which might be absorbed by the much more responsive aluminum piston body.

In the form of device shown at the bottom of Figure 1 and in Figure 7, the limit ring in cross section takes a U-shaped form, as shown at M, each lateral branch engaging about the corresponding projecting end of an aluminum piston body N, which, after the limit ring has been placed in position, can be further added to or built up by any desired assembling means which while keeping the component aluminum bodies properly associated, will allow sufficiently for the "creeping" of the aluminum relatively to the encircling limit ring when the former expands as heated. This type, it will be observed, thus serves to limit both inward and outward contractive or expansive movement of the piston body and is consequently of value, in the case of some metallic compounds, wherein repeated heating and resultant attempted expansion of the piston's body, followed by its cooling off between such periods of use, has seemed to cause a definite and permanent shrinkage of the metal to dimensions below its intended and original size.

I have also utilized Figure 1 to bring out the features of a construction wherein I position a ring of the plain type E more nearly about the center of the piston body, and a second ring of the U-shaped form illustrated at M about one end of the piston body, thus counteracting with both rings the expansive tendency of the piston body when heated, and also counteracting its shrinking tendency when cooling by means of the internally engaging branch or flange Q of the terminal ring M.

What I claim is:

The combination, with a piston body of relatively high expansive characteristics, of a band of U-shaped cross-section engaging over a terminal edge of the piston body to effect its close engagement against each surface thereof at normal temperatures, said band being formed of a metal having a relatively low coefficient of expansion and thereby serving to resist the relatively rapid response of the component metal of the piston body to changes in its thermal condition, and a second band of similar metallurgical characteristics mechanically locked about a groove in the intermediate portion of the piston body to circumferentially resist the heat-induced expansion of that portion of the piston.

In testimony whereof, I sign this specification.

WILLIAM R. WILEY.